United States Patent
Cheru et al.

(10) Patent No.: US 11,321,291 B2
(45) Date of Patent: May 3, 2022

(54) PERSISTENT VERSION CONTROL FOR DATA TRANSFER BETWEEN HETEROGENEOUS DATA STORES

(71) Applicant: Western Digital Technologies, Inc., San Jose, CA (US)

(72) Inventors: Tomy Ammuthan Cheru, Thrissur (IN); Muhammad Tanweer Alam, Bangalore (IN); Vibhor Arunkumar Patale, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 258 days.

(21) Appl. No.: 16/361,467

(22) Filed: Mar. 22, 2019

(65) Prior Publication Data

US 2019/0370236 A1 Dec. 5, 2019

(30) Foreign Application Priority Data

Jun. 2, 2018 (IN) .............................. 201811020720

(51) Int. Cl.
| | |
|---|---|
| *G06F 16/215* | (2019.01) |
| *G06F 16/2457* | (2019.01) |
| *G06F 16/21* | (2019.01) |
| *G06F 16/2458* | (2019.01) |
| *G06F 9/54* | (2006.01) |

(Continued)

(52) U.S. Cl.
CPC ............ *G06F 16/219* (2019.01); *G06F 9/542* (2013.01); *G06F 16/215* (2019.01); *G06F 16/2336* (2019.01); *G06F 16/2474* (2019.01); *G06F 16/24573* (2019.01); *G06F 16/289* (2019.01)

(58) Field of Classification Search
CPC ...... G06F 16/1873; G06F 16/219; G06F 8/71; G06F 16/2336; G06F 16/24573; G06F 16/2474; G06F 9/542; G06F 16/289; G06F 16/215

See application file for complete search history.

(56) References Cited

U.S. PATENT DOCUMENTS

| | | | |
|---|---|---|---|
| 5,649,200 A | 7/1997 | Leblang et al. | |
| 5,729,744 A * | 3/1998 | Gerken | ..................... G06F 8/71 |

(Continued)

FOREIGN PATENT DOCUMENTS

WO 2017023709 A1 2/2017

OTHER PUBLICATIONS

International Search Report and Written Opinion of Application No. PCT/US2019/023745, dated Jul. 2, 2019, p. 1-12.

(Continued)

*Primary Examiner* — Cheyne D Ly
(74) *Attorney, Agent, or Firm* — Patent Law Works LLP

(57) ABSTRACT

Example distributed storage systems, version control managers, and methods provide persistent version control for data transfers between heterogeneous data stores. A first object data store includes a versioned data object with a plurality of sequential versions corresponding to the versioned data object. A version control manager is configured to determine a creation timestamp for each of the plurality of sequential versions and store a persistent version field for each. The persistent version field remains associated with each of the plurality of sequential versions when transferred from the first object data store to a second object data store.

20 Claims, 9 Drawing Sheets

(51) Int. Cl.
*G06F 16/28* (2019.01)
*G06F 16/23* (2019.01)

(56) References Cited

U.S. PATENT DOCUMENTS

| | | | |
|---|---|---|---|
| 5,813,009 A * | 9/1998 | Johnson | G06F 16/40 |
| | | | 707/695 |
| 6,615,223 B1 | 9/2003 | Shih et al. | |
| 8,504,758 B1 | 8/2013 | McHugh et al. | |
| 8,533,170 B1 * | 9/2013 | McHugh | G06F 16/1873 |
| | | | 707/695 |
| 8,650,156 B1 | 2/2014 | McHugh et al. | |
| 8,731,994 B2 | 5/2014 | Kass et al. | |
| 2003/0145199 A1 | 7/2003 | Miller et al. | |
| 2005/0027757 A1 * | 2/2005 | Kiessig | G06F 16/10 |
| 2007/0208790 A1 | 9/2007 | Reuter et al. | |
| 2008/0005077 A1 * | 1/2008 | Eggebraaten | G06F 16/219 |
| 2008/0059608 A1 | 3/2008 | Wood et al. | |
| 2010/0191774 A1 | 7/2010 | Mason, Jr. et al. | |
| 2012/0109915 A1 | 5/2012 | Kamekawa | |
| 2013/0275379 A1 | 10/2013 | Trebas et al. | |
| 2014/0143208 A1 | 5/2014 | Kohl et al. | |
| 2014/0149353 A1 * | 5/2014 | Lee | G06F 16/174 |
| | | | 707/639 |
| 2014/0244708 A1 | 8/2014 | Taine et al. | |
| 2015/0363271 A1 | 12/2015 | Haustein et al. | |
| 2016/0092526 A1 | 3/2016 | Kothari et al. | |
| 2016/0140133 A1 | 5/2016 | Lu et al. | |
| 2016/0330299 A1 | 11/2016 | Hu | |
| 2017/0032006 A1 * | 2/2017 | Anglin | G06F 3/0604 |
| 2017/0359400 A1 | 12/2017 | Demulder et al. | |
| 2018/0019867 A1 | 1/2018 | Davis | |

OTHER PUBLICATIONS

International Search Report and Written Opinion of Application No. PCT/US2019/023751, dated Jul. 2, 2019, p. 1-12.

* cited by examiner

PERSISTENT VERSION CONTROL FOR DATA TRANSFER BETWEEN HETEROGENEOUS DATA STORES

TECHNICAL FIELD

The present disclosure generally relates to data storage, and in a more particular example, to version control for data transfer between heterogeneous data stores.

BACKGROUND

Often, distributed storage systems are used to store large amounts (e.g., terabytes, petabytes, exabytes, etc.) of data, such as objects or files in a distributed and fault tolerant manner with a predetermined level of redundancy.

Some existing object storage systems store data objects referenced by an object identifier versus file systems. This can generally allow object storage systems to surpass the maximum limits for storage capacity of file systems in a flexible way such that, for example, storage capacity can be added or removed as a function of the applications, systems, and/or enterprise needs, while reducing degradation in performance as the system grows. As a result, object storage systems are often selected for large-scale storage systems.

These large-scale storage systems may include a variety of storage systems in varying locations and of varying ages and configurations. As a result, not all object data stores within a large-scale storage system may be configured to manage data objects and their related metadata in the same way. Such disparate configurations within the same storage system may be referred to as heterogeneous data stores. Within or between object storage systems, individual buckets may also be configured differently and described as heterogeneous.

Large-scale storage systems generally distribute the stored data over multiple storage elements, such as for example solid state drives, or multiple components such as storage nodes comprising a plurality of such storage elements. However, as the number of storage elements in such a distributed storage system increase, the probability of failure of one or more of these storage elements increases, as does the probability of failure or interruption of controller, network, and interface components. To cope with these issue, distributed storage systems generally use some level of redundancy at the data, storage node, controller, interface, client, and network levels. In some cases, redundancy may include moving data objects between object data stores, such as using one or more replication agents, for mirroring, load balancing, and/or disaster recovery.

Version control among heterogeneous data stores may present a challenge. For example, when a versioned object is transferred to an object data store or bucket that does not have versioning enabled, version information may be lost. Also, because many replication agents use parallel and/or asynchronous replication paths, it is possible for versions of the same versioned object to be transferred in a different order than they were stored in the originating data store. This may result in object versions being written out of their original timestamp order, with new creation timestamps in the destination system that do not match the version order in the originating data store. As a result, data may be corrupted, lost, or mishandled by the storage system, which may incorrectly identify the most recent version (or the order of prior versions) due to the out of order ingestion into the destination object data store. This problem may be compounded when versioned objects are deleted.

As large-scale storage systems scale and create more heterogeneous object data stores within storage systems, reliable and efficient implementations for managing version control may be needed. A need exists for at least persistent version control for data transfer between heterogeneous data stores.

SUMMARY

Various aspects for persistent version control, particularly, persistent version control for data transfer between heterogeneous data stores are described.

One general aspect includes a system that includes a first object data store including a first plurality of versioned data objects. A versioned data object of the first plurality of versioned data objects includes a plurality of sequential versions corresponding to the versioned data object. The system further includes a version control manager associated with the first object data store. The version control manager includes instructions stored in at least one memory and executable by at least one processor to determine, in response to creation of each sequential version of the plurality of sequential versions, a creation timestamp for each sequential version of the plurality of sequential versions and store a persistent version field for each sequential version of the plurality of sequential versions, where the persistent version field for each sequential version of the plurality of sequential versions remains associated with each sequential version of the plurality of sequential versions when transferred from the first object data store to a second object data store.

Implementations may include one or more of the following features. The system may further include a replication manager including instructions stored in at least one memory and executable by at least one processor to: read the plurality of sequential versions corresponding to the versioned data object; read the persistent version field for each sequential version of the plurality of sequential versions; and transfer the plurality of sequential versions and the persistent version field for each sequential version of the plurality of sequential versions to the second object data store. The version control manager may be further configured to: read the persistent version field for each sequential version of the plurality of sequential versions; determine, based on the persistent version field, a most recent version from the plurality of sequential versions; and return the most recent version from the plurality of sequential versions. The version control manager may be further configured to generate, responsive to a delete event, a delete marker sequential version in the plurality of sequential versions. The persistent version field for the delete marker sequential version may include a delete timestamp value corresponding to the delete event. The delete marker sequential version may be a data object including: a host data object size of 0; a delete marker data object name equal to a data object name of the versioned data object; and a delete marker identifier. The persistent version field for each sequential version of the plurality of sequential versions may include a unique version identifier for a selected sequential version and the creation timestamp for the selected sequential version. The persistent version field for each sequential version of the plurality of sequential versions may further include a data object name of the versioned data object and a data bucket name of a data bucket containing the plurality of sequential versions for the versioned data object. The version control manager may store the persistent version field for each sequential version of the plurality of sequential versions in an associated object data source selected from a first metadata store for the first object data store and object data tags stored with each sequential version of the plurality of sequential versions in the first object data store.

One general aspect includes a computer-implemented method including: creating a new version of a versioned data object; determining, in response to creation of the new version, a creation timestamp for the new version; and storing a persistent version field for the new version. The versioned data object is stored in a first object data store. The versioned data object includes a plurality of sequential versions corresponding to the versioned data object. The new version of the versioned data object is a most recently created version among the plurality of sequential versions. The persistent version field for the new version remains associated with a new version data object responsive to the new version data object being transferred from the first object data store to a second object data store.

Implementations may include one or more of the following features. The computer-implemented method may further include: reading the plurality of sequential versions corresponding to the versioned data object; reading persistent version fields for each of the plurality of sequential versions; and transferring the plurality of sequential versions and the persistent version fields for each sequential version of the plurality of sequential versions to the second object data store. The computer-implemented method may further include: reading persistent version fields for each sequential version of the plurality of sequential versions; determining, based on the persistent version fields, a most recent version from the plurality of sequential versions; and returning the most recent version from the plurality of sequential versions. The computer-implemented method may further include receiving a get wrapper function call for the versioned data object. Reading persistent version fields, determining the most recent version, and returning the most recent version may be responsive to the get wrapper function call. The computer-implemented method may further include generating, responsive to a delete event, a delete marker sequential version in the plurality of sequential versions. The persistent version field for the delete marker sequential version may include a delete timestamp value corresponding to the delete event. The delete marker sequential version may be a data object including: a host data object size of 0; a delete marker data object name equal to a data object name of the versioned data object; and a delete marker identifier. The persistent version field for the new version may include a unique version identifier for the new version and the creation timestamp for the new version. The persistent version field for the new version may further include a data object name of the versioned data object and a data bucket name of a data bucket containing the plurality of sequential versions for the versioned data object in the first object data store. The computer-implemented method further including: storing the plurality of sequential versions and corresponding persistent version fields from the first object data store to the second object data store; and writing, responsive to a disaster recovery event, the plurality of sequential versions and corresponding persistent version fields from the second object data store to the first object data store. Storing the persistent version field for the new version may include writing the persistent version field in an associated object data source for the versioned data object. The associated object data source may be selected from a first metadata store for the first object data store and object data tags stored with the new version in the first object data store.

One general aspect includes a system that includes a first object data store configured to include a first plurality of versioned data objects. A versioned data object includes a plurality of sequential versions corresponding to the versioned data object. The system further includes: means for determining, in response to creation of each sequential version of the plurality of sequential versions, a creation timestamp for each sequential version of the plurality of sequential versions; and means for storing a persistent version field for each sequential version of the plurality of sequential versions. The persistent version field for each sequential version of the plurality of sequential versions remains associated with each sequential version of the plurality of sequential versions when transferred from the first object data store to a second object data store.

Implementations may include one or more of the following features. The system may further include means for generating, responsive to a delete event, a delete marker sequential version in the plurality of sequential versions. The persistent version field for the delete marker sequential version may include a delete timestamp value corresponding to the delete event.

The various embodiments advantageously apply the teachings of distributed storage networks and/or systems to improve the functionality of such computer systems. The various embodiments include operations to overcome or at least reduce the issues in the previous storage networks and/or systems discussed above and, accordingly, are more reliable and/or efficient than other computing networks. That is, the various embodiments disclosed herein include hardware and/or software with functionality to improve the version control for data transfer between heterogeneous data stores, such as by using persistent versioning fields associated with the data objects and transferred between data stores. Accordingly, the embodiments disclosed herein provide various improvements to storage networks and/or storage systems.

It should be understood that language used in the present disclosure has been principally selected for readability and instructional purposes, and not to limit the scope of the subject matter disclosed herein.

DETAILED DESCRIPTION

Figure 1:
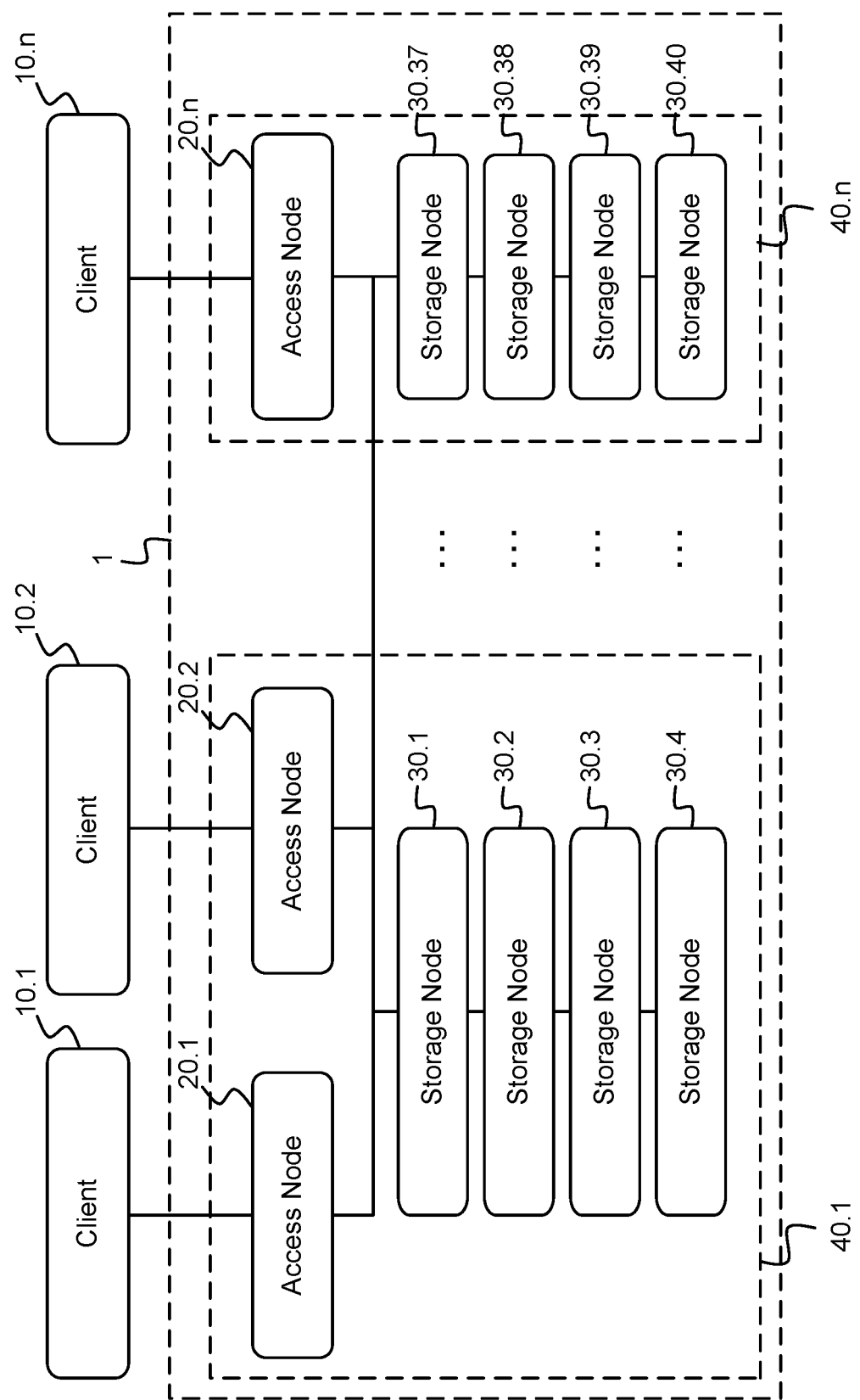
FIG. 1 schematically illustrates an example of a distributed storage system.

As discussed above, out of order versioned object write ingestion can occur in heterogeneous object storage systems between versioning enabled heterogeneous buckets.

Object storage systems have a notion of data objects. Data objects may be contained in buckets and each bucket may be associated with a specific object storage system or object data store. Specific object storage systems may include a number of configuration parameters, including support for versioning. In some systems, individual buckets may include different configuration parameters, including enabling and disabling version control within an object storage system that is otherwise configured for versioning.

In many object storage systems, a data object is written using either a PUT function, for single part objects, or a multi-part write process, such as INIT, multiple PARTPUT, and COMPLETE functions. Data objects written to a versioning not enabled or versioning suspended system or bucket, may create a data object with a version value set to null and a creation timestamp. Subsequent read functions, such as GET, of the data object with a defined object name (ex. "object1") may return the data object ("object1"). If an object is later written with the same object name ("object1"), the original object may be overwritten. Subsequent GET operations with the object name ("object1") may return the overwritten object and the original object may be lost.

However, in a versioning enabled system or bucket, earlier versions of the object may not get overwritten. A new write of an existing data object ("object1") may create a new version of that object. The object name does not change, but an additional version identifier may be associated with the new write. For example, when the object is initially written, it may receive a version identifier (ex. "1111"). Subsequent GET operations for the object name ("object1") return the object ("object1") with the most recent version identifier ("1111"). Each subsequent time an object with the same object name is written with versioning enabled, a new object is created with the same object name ("object1") but a new creation timestamp and a new version identifier (e.g. "2222", "3333", etc.). The set of data objects with the same object name and different version identifiers in a given storage system or bucket may be referred to collectively as a versioned data object, comprised of a plurality of data object versions. Ordering of versions may be important for GET operations that do not specify a version and are intended to retrieve the latest version of the object.

Data object creation time and versioning depends on specific implementations in different object storage systems, resulting in heterogeneous versioning configurations. Versioning may be different among different object storage systems, implementing entirely different versioning schemes that may not be recognized by other object storage systems. For example, the versioning identifiers may be in a format or location that is unknown to the other system. In such a case, a GET function from the other system intended to include a version request may not comply with the necessary operation syntax and may return an error, an empty object, or a default version, such as the most recent according to the local creation timestamp or versioning scheme.

This challenge may be compounded by transfers between object storage systems that do not necessarily occur in version order. Asynchronous object replication or transfer between heterogeneous object storage systems may cause object versions to be ingested by the destination system in a different order than they were stored in the source system. It may be possible for the object versions to be mangled in such a way that objects ingested at the destination system are not in time order and may be assigned local versioning information in a new and incorrect order. Subsequent GET operations against the destination system may return inappropriate object versions and may include creation timestamps reflecting their new and out-of-order creation times. While it may be possible to fix the timestamps and versioning manually in systems that include editors for such metadata fields or tags, that requires knowledge that the error has occurred and additional resources to make the corrections.

Further, in addition to the changed order, original creation timestamps and versioning identifiers from the original system may be lost during the transfer. This loss may make it impossible to reconstruct the original data store with appropriate versioning and timestamps in the event of data recover, without a more persistent source of versioning data.

In some embodiments, the original bucket name, bucket identifier, version identifier, creation timestamp, and/or similar fields may be persisted from the original data store and transferred with the versioned data object, regardless of the order in which the object versions are transferred. Persistent metadata and/or data object tagging may be used to persist this data and allow storage systems to restore the original data object versions, with their original version identifiers, creation timestamps, and other data.

FIG. 1 shows an embodiment of an example distributed storage system 1. In some embodiments, the distributed storage system 1 may be implemented as a distributed object storage system which is coupled to one or more clients 10.1-10.n for accessing data objects through one or more access nodes 20.1-10.n. The connection between the distributed storage system 1 and clients 10 could, for example, be implemented as a suitable data communication network. Clients 10 may host or interface with one or more applications that use data stored in distributed storage system 1. Such an application could, for example, be a dedicated software application running on a client computing device, such as a personal computer, a laptop, a wireless telephone, a personal digital assistant or any other type of communication device that is able to interface directly with the distributed storage system 1. However, according to alternative embodiments, the applications could, for example, comprise a suitable file system which enables a general purpose software application to interface with the distributed storage system 1, an application programming interface (API) library for the distributed storage system 1, etc. In some embodiments, access nodes 20 may include a file interface system for receiving file data requests from clients 10 according to a file system protocol and access data in storage nodes 30.1-30.40 using a different storage protocol, such as an object storage protocol.

As further shown in FIG. 1, the distributed storage system 1 comprises a plurality of access nodes 20 and a plurality of storage nodes 30 which may be coupled in a suitable way for transferring data, for example by means of a conventional data communication network such as a local area network (LAN), a wide area network (WAN), a telephone network, such as the public switched telephone network (PSTN), an intranet, the internet, or any other suitable communication network or combination of communication networks.

Access nodes 20, storage nodes 30 and the computing devices comprising clients 10 may connect to the data communication network by means of suitable wired, wireless, optical, etc. network connections or any suitable combination of such network connections. Although the embodiment of FIG. 1 shows only three access nodes 20 and forty storage nodes 30, according to alternative embodiments the distributed storage system 1 could comprise any other suitable number of storage nodes 30 and, for example, two, three or more access nodes 20 coupled to these storage nodes 30.

These access nodes 20 and storage nodes 30 may be built as general-purpose computers. Alternatively, they may be physically adapted for arrangement in large data centers, where they are arranged in modular racks 40.1-40.n comprising standard dimensions. Exemplary access nodes 20 and storage nodes 30 may be dimensioned to take up a single unit of such racks 40, which is generally referred to as 1U. Such an exemplary storage node may use a low-power processor and may be equipped with ten or twelve high capacity serial advanced technology attachment (SATA) disk drives and is connectable to the network over redundant Ethernet network interfaces. An exemplary access node 20 may comprise high-performance servers and provide network access to clients 10 over multiple high bandwidth Ethernet network interfaces. Data can be transferred between clients 10 and such access nodes 20 by means of a variety of network protocols including hypertext transfer protocol (HTTP)/representational state transfer (REST) object interfaces, language-specific interfaces such as Microsoft.Net, Python or C, etc. Additionally, such access nodes may comprise additional high bandwidth Ethernet ports to interface with the storage nodes 30. In some embodiments, HTTP/REST protocols complying with the Amazon Simple Storage Service (S3) object storage service may enable data transfer through a REST application protocol interfaces (API). Such access nodes 20 may operate as a highly available cluster of controller nodes with one or more integrated and/or independent interface systems, and provide for example shared access to the storage nodes 30, metadata caching, protection of metadata, etc.

As shown in FIG. 1 several storage nodes 30 can be grouped together, for example because they are housed in a single rack 40. For example, storage nodes 30.1-30.4 and 30.7-30.40 each are respectively grouped into racks 40.1 and 40.n. Access nodes 20 may be located in the same or different racks as the storage nodes to which the access nodes connect. A rack may have multiple access nodes, for example rack 40.1, a single access node as rack 40.n, or no access nodes (not shown) and rely on an access node in another rack or storage nodes or clients with built-in access node and/or controller node capabilities. These racks are not required to be located at the same location, they are often geographically dispersed across different data centers, such as for example rack 40.1-40.3 can be located at a data center in Europe, 40.4-40.7 at a data center in the USA and 40.8-40.10 at a data center in China.

Figure 2:
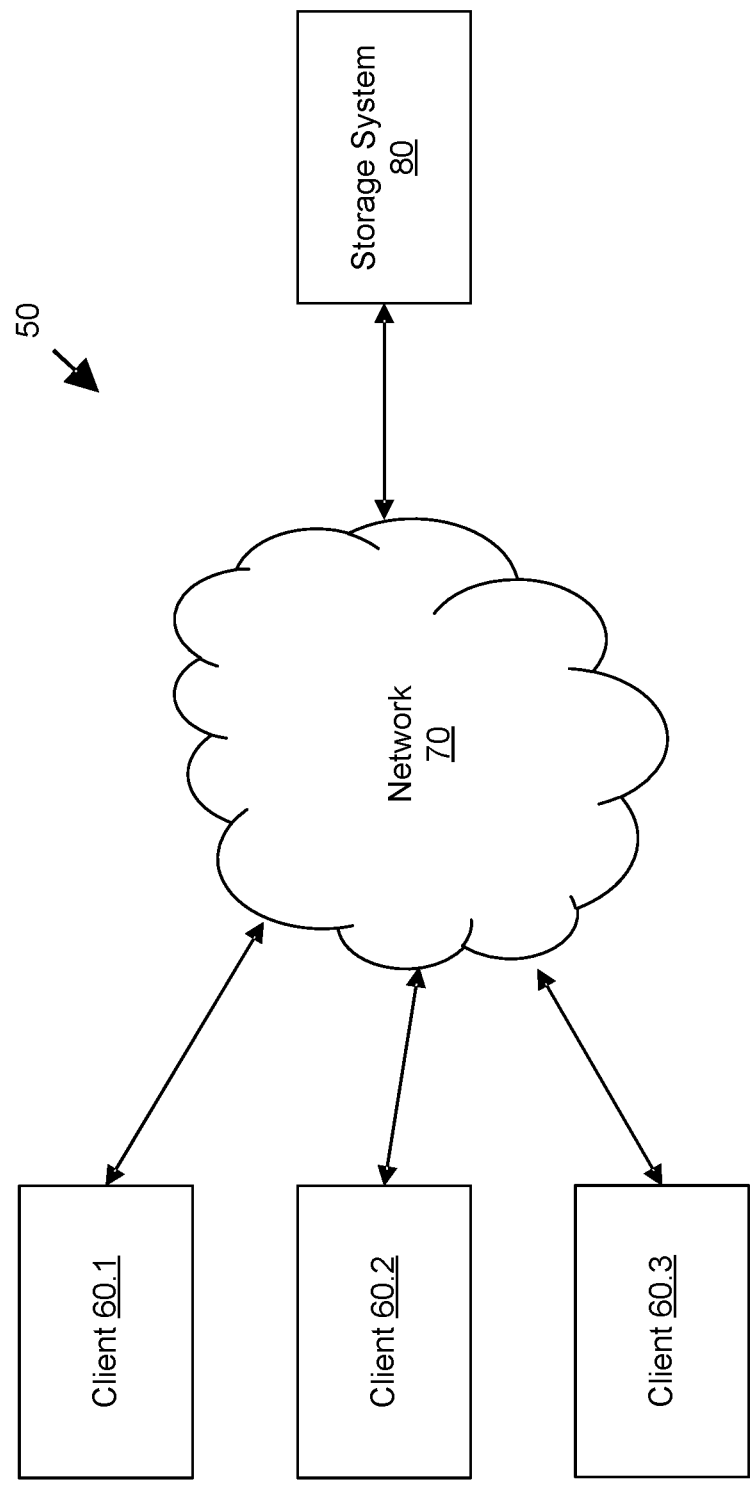
FIG. 2 schematically illustrates an example client architecture in which the distributed storage system of FIG. 1 may operate.

FIG. 2 is a block diagram of an example storage network 50 using a client architecture. In some embodiments, distributed storage system 1 may be embodied in such a storage network 50. As shown, storage network 50 can include multiple client devices 60 capable of being coupled to and in communication with a storage network 50 via a wired and/or wireless network 70 (e.g., public and/or private computer networks in any number and/or configuration (e.g., the Internet, an intranet, a cloud network, etc.)), among other examples that may include one client device 60.1 or two or more client devices 60 (e.g., is not limited to three client devices 60.1-60.3).

A client device 60 can be any computing hardware and/or software (e.g., a thick client, a thin client, or hybrid thereof) capable of accessing storage system 80 utilizing network 70. Each client device 60, as part of its respective operation, relies on sending input/output (I/O) requests to storage system 80 to write data, read data, and/or modify data. Specifically, each client device 60 can transmit I/O requests to read, write, store, communicate, propagate, and/or transport instructions, data, computer programs, software, code, routines, etc., to storage system 80. Client device(s) 60 and storage system 80 may comprise at least a portion of a client-server model. In general, storage system 80 can be accessed by client device(s) 60 and/or communication with storage system 80 can be initiated by client device(s) 60 through a network socket (not shown) utilizing one or more inter-process networking techniques. In some embodiments, client devices 60 may access one or more applications to use or manage a distributed storage system, such as distributed storage system 1 in FIG. 1.

Figure 3:
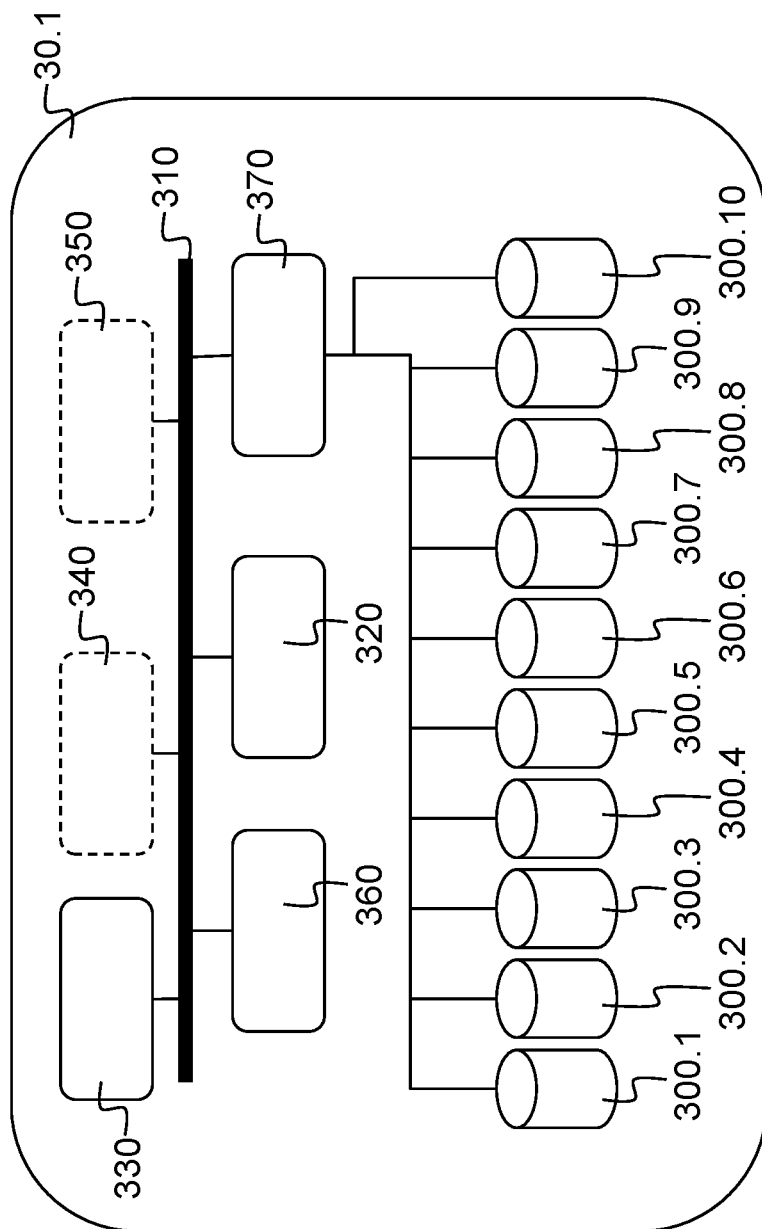
FIG. 3 schematically illustrates an example of a storage node of the distributed storage system of FIG. 1.

FIG. 3 shows a schematic representation of an embodiment of one of the storage nodes 30. Storage node 30.1 may comprise a bus 310, a processor 320, a local memory 330, one or more optional input units 340, one or more optional output units 350, a communication interface 360, a storage element interface 370, and two or more storage elements 300.1-300.10. Bus 310 may include one or more conductors that permit communication among the components of storage node 30.1. Processor 320 may include any type of conventional processor or microprocessor that interprets and executes instructions. Local memory 330 may include a random access memory (RAM) or another type of dynamic storage device that stores information and instructions for execution by processor 320 and/or a read only memory (ROM) or another type of static storage device that stores static information and instructions for use by processor 320. Input unit 340 may include one or more conventional mechanisms that permit an operator to input information to the storage node 30.1, such as a keyboard, a mouse, a pen, voice recognition and/or biometric mechanisms, etc. Output unit 350 may include one or more conventional mechanisms that output information to the operator, such as a display, a printer, a speaker, etc. Communication interface 360 may include any transceiver-like mechanism that enables storage node 30.1 to communicate with other devices and/or systems, for example mechanisms for communicating with other storage nodes 30 or access nodes 20 such as for example two 1 Gb Ethernet interfaces.

Storage element interface 370 may comprise a storage interface such as for example a SATA interface or a small computer system interface (SCSI) for connecting bus 310 to one or more storage elements 300, such as one or more local disks, for example 3 terabyte (TB) SATA disk drives, and control the reading and writing of data to/from these storage elements 300. In one exemplary embodiment as shown in FIG. 2, such a storage node 30.1 could comprise ten or twelve 3 TB SATA disk drives as storage elements 300.1-300.10 and in this way storage node 30.1 would provide a storage capacity of 30 TB or 36 TB to the distributed storage system 1. According to the exemplary embodiment of FIG. 1 and in the event that storage nodes 30.2-30.40 are identical to storage node 30.1 and each comprise a storage capacity of 36 TB, the distributed storage system 1 would then have a total storage capacity of 1440 TB.

As is clear from FIGS. 1 and 3 the distributed storage system 1 comprises a plurality of storage elements 300. As will be described in further detail below, the storage elements 300, could also be referred to as redundant storage elements 300 as the data is stored on these storage elements 300 such that none or a specific portion of the individual storage elements 300 on its own is critical for the functioning of the distributed storage system. Each of the storage nodes 30 may comprise a share of these storage elements 300.

As shown in FIG. 1 storage node 30.1 comprises ten storage elements 300.1-300.10. Other storage nodes 30 could comprise a similar amount of storage elements 300, but this is, however, not essential. Storage node 30.2 could, for example, comprise six storage elements 300.11-300.16, and storage node 30.3 could, for example, comprise four storage elements 300.17-300.20. As will be explained in further detail below, the distributed storage system 1 may be operable as a distributed object storage system to store and retrieve a data object comprising data (e.g. 64 megabytes (MB) of binary data) and a data object identifier for addressing this data object, for example, a universally unique identifier such as a globally unique identifier (GUID). Embodiments of the distributed storage system 1 may operate as a distributed object storage system. Storing the data offered for storage by the application in the form of a data object, also referred to as object storage, may have specific advantages over other storage schemes such as block-based storage or file-based storage.

The storage elements 300 or a portion thereof may be redundant and operate independently of one another. This means that if one particular storage element 300 fails its function it can easily be taken on by another storage element 300 in the distributed storage system 1. However, as will be explained in more detail further below, the storage elements 300 are capable of providing redundancy without having to work in synchronism, as is for example the case in many well-known redundant array of independent disks (RAID) configurations, which sometimes even require disc spindle rotation to be synchronised. Furthermore, the independent and redundant operation of the storage elements 300 may allow a suitable mix of types of storage elements 300 to be used in a particular distributed storage system 1. It is possible to use for example storage elements 300 with differing storage capacity, storage elements 300 of differing manufacturers, using different hardware technology such as for example conventional hard disks and solid state storage elements, using different storage interfaces such as for example different revisions of SATA, parallel advanced technology attachment (PATA), and so on. This may result in advantages relating to scalability and flexibility of the distributed storage system 1 as it allows for adding or removing storage elements 300 without imposing specific requirements to their design in correlation to other storage elements 300 already in use in the distributed object storage system.

Figure 4:
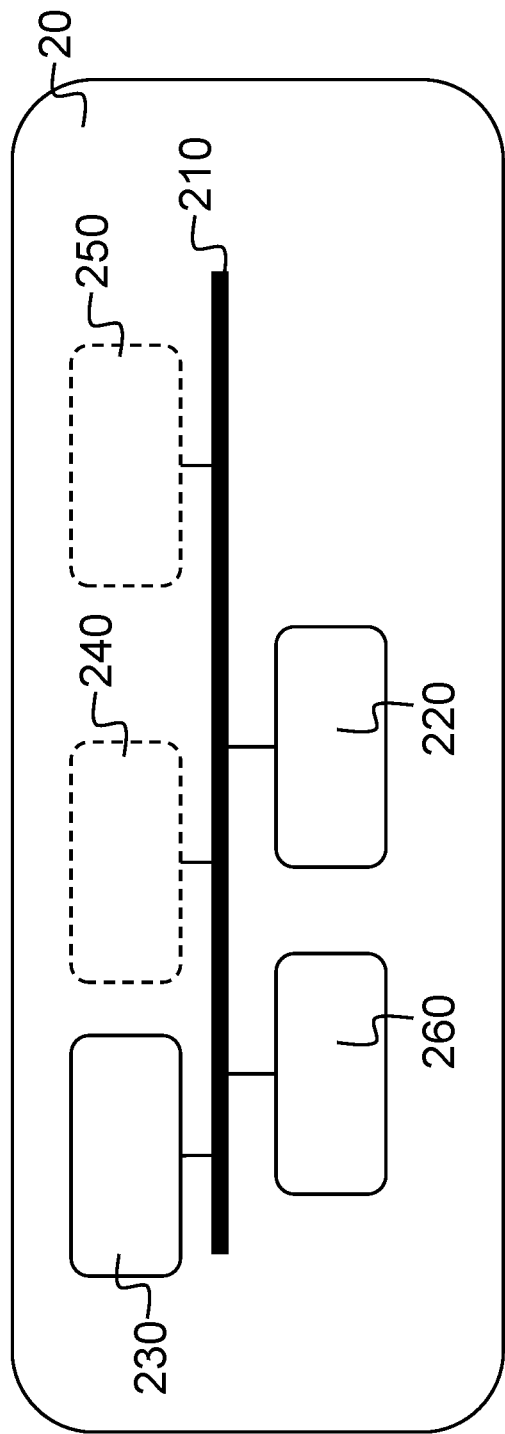
FIG. 4 schematically illustrates an example of a controller node or access node of the distributed storage system of FIG. 1.

FIG. 4 shows a schematic representation of an embodiment of the access node 20. Access node 20 may include controller node functions and/or file system interface functions for client systems using file system protocols to access data stored in data objects in storage nodes 30. Access node 20 may comprise a bus 210, a processor 220, a local memory 230, one or more optional input units 240, one or more optional output units 250. In some embodiments, access node 20 may include object storage management functions, including object storage interface functions, version control management, and/or replication engines.

Bus 210 may include one or more conductors that permit communication among the components of access node 20. Processor 220 may include any type of conventional processor or microprocessor that interprets and executes instructions. Local memory 230 may include a random access memory (RAM) or another type of dynamic storage device that stores information and instructions for execution by processor 220 and/or a read only memory (ROM) or another type of static storage device that stores static information and instructions for use by processor 320 and/or any suitable storage element such as a hard disc or a solid state storage element. An optional input unit 240 may include one or more conventional mechanisms that permit an operator to input information to the access node 20 such as a keyboard, a mouse, a pen, voice recognition and/or biometric mechanisms, etc. Optional output unit 250 may include one or more conventional mechanisms that output information to the operator, such as a display, a printer, a speaker, etc. Communication interface 260 may include any transceiver-like mechanism that enables access node 20 to communicate with other devices and/or systems, for example mechanisms for communicating with other storage nodes 30 or access nodes 20 such as for example two 10 Gb Ethernet interfaces.

According to an alternative embodiment, the access node 20 could have an identical design as a storage node 30, or according to still a further alternative embodiment one of the storage nodes 30 of the distributed object storage system could perform both the function of an access node 20 and a storage node 30. According to still further embodiments, the components of the access node 20 as described in more detail below could be distributed amongst a plurality of access nodes 20 and/or storage nodes 30 in any suitable way. According to still a further embodiment, the clients 10 may run an access node 20. According to still further embodiments, access node 20 may be embodied in separate controller nodes and interface nodes with or without redundancy among the controller nodes and/or interface nodes.

Figure 5:
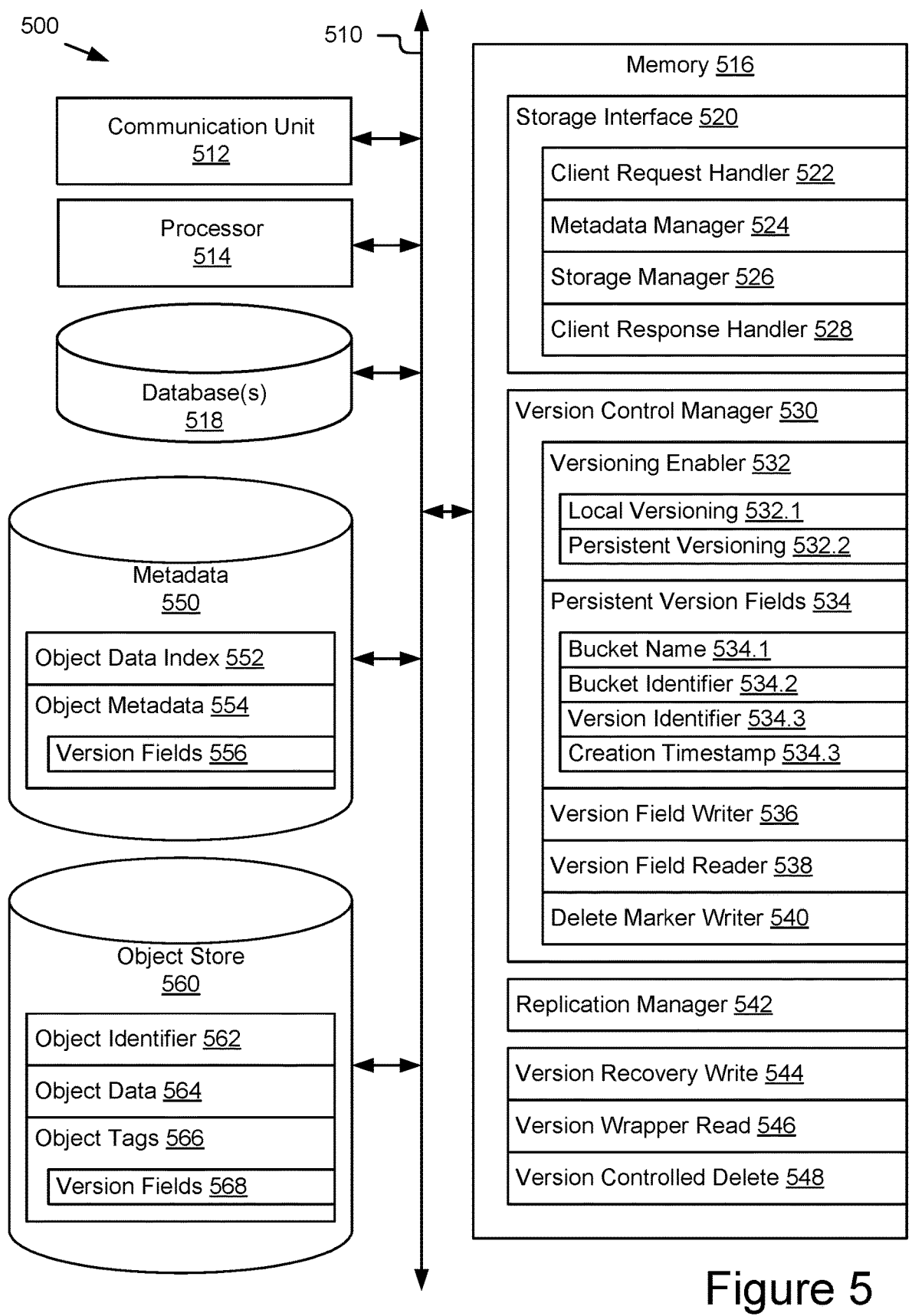
FIG. 5 schematically illustrates some example elements of an object storage system for the distributed storage system of FIG. 1.

FIG. 5 schematically shows selected modules of an access node or controller node with version control management and supporting functions. Object storage system 500 may be configured as a node with an architecture and/or hardware similar to controller nodes and/or storage nodes. Object storage system 500 may incorporate elements and configurations similar to those shown in FIGS. 1-4. For example, object storage system 500 may be configured in an access node 20 with object storage management functions.

Object storage system 500 may include a bus 510 interconnecting at least one communication unit 512, at least one processor 514, and at least one memory 516. Bus 510 may include one or more conductors that permit communication among the components of access system 500. Communication unit 512 may include any transceiver-like mechanism that enables access system 500 to communicate with other devices and/or systems. For example, communication unit 512 may include wired or wireless mechanisms for communicating with file system clients, other access systems, and/or one or more object storage systems or components, such as storage nodes or controller nodes. Processor 514 may include any type of processor or microprocessor that interprets and executes instructions. Memory 516 may include a random access memory (RAM) or another type of dynamic storage device that stores information and instructions for execution by processor 514 and/or a read only memory (ROM) or another type of static storage device that stores static information and instructions for use by processor 514 and/or any suitable storage element such as a hard disc or a solid state storage element.

Object storage system 500 may include or have access to one or more databases and/or specialized data stores, such metadata store 550 and object store 560. Databases may include one or more data structures for storing, retrieving, indexing, searching, filtering, etc. of structured and/or unstructured data elements. In some embodiments, metadata store 550 may be structured as reference data entries and/or data fields indexed by metadata key value entries related to data objects stores in object store 560. Object store 560 may include data objects comprised of object data (such as host data), some amount of metadata (stored as metadata tags), and a GUID. Metadata store 550, object store 560, and/or other databases or data structures may be maintained and managed in separate computing systems, such as storage nodes, with separate communication, processor, memory, and other computing resources and accessed by access system 500 through data access protocols. Metadata store 550 and object store 560 may be shared across multiple object storage systems 500.

Object storage system 500 may include a plurality of modules or subsystems that are stored and/or instantiated in memory 516 for execution by processor 514. For example, memory 516 may include a storage interface 520 configured to receive, process, and respond to object data requests from client systems or other nodes in distributed storage system 1. Memory 516 may include a version control manager 530 for creating and managing object versions in object store 560. Memory 516 may include a replication manager 542 for processing data replication between storage nodes or storage systems, such as transferring or replicating data objects to other object stores that may be heterogeneous. In some embodiments, version control manager 530 and/or replication manager 542 may be integrated into storage interface 520 and/or managed as separate libraries or background processes (e.g. daemon) through an API or other interface.

Memory 516 may also include defined functions, methods, or operations related to version control. In some embodiments, these functions may be defined as part of a version control API or special functions to support replication, migration, disaster recovery, or similar storage management operations. In the example shown, a version recovery write 544, a version wrapper read 546, and a version controlled delete 548 may be defined and called by other modules, such as storage interface 520, version control manager 530, and/or replication manager 542 and/or available to other clients, libraries, systems, or users through one or more APIs.

Storage interface 520 may include an interface protocol or set of functions and parameters for storing, reading, and otherwise managing data requests to an associated distributed storage system and the corresponding metadata data source for mapping file data to persistent storage data elements. For example, storage interface 520 may include functions for reading, writing, modifying, or otherwise manipulating data objects and their respective client or host data and metadata in accordance with the protocols of an object storage system.

In some embodiments, storage interface 520 may include a plurality of hardware and/or software modules configured to use processor 514 and memory 516 to handle or manage defined operations of storage interface 520. For example, storage interface 520 may include a client request handler 522, a metadata manager 524, a storage manager 526, and a client response handler 528. For any given client request, storage interface 520 may receive a client request through client request handler 522 and determine one or more operations based on the content of the request. These operations may include metadata operations handled by metadata manager 524 and/or object data operations handled by storage manager 526. The results of these operations may be processed, formatted, and returned by client response handler 528.

Storage interface 520 may include one or more object storage configurations that define a storage protocol used for validating, managing, and processing object data requests. For example, object storage configurations may generally define the availability of version control for any give object or bucket, as well as specifying how the object storage system creates and manages versioning information. Object storage configurations may also define what metadata is collected and stored, as well as whether it is stored in a metadata database, such as metadata store 550, in object metadata tags stored in the data objects, and/or a combination thereof.

Client request handler 522 may include an interface and/or communication event-based condition for receiving object data requests from one or more clients. For example, client systems may send an object data request over a network connection and addressed to object storage system 500 or a port or component thereof. Client request handler 522 may receive these requests and parse them according to the appropriate communication and object storage protocols. For example, client request handler 522 may identify a transaction identifier, a client identifier, an object identifier (object name or GUID), a data operation, and additional parameters for the data operation, if any, from the received message or messages that make up the object data request.

Metadata manager 524 may include interfaces, functions, and/or parameters for creating, modifying, deleting, accessing, and/or otherwise managing object metadata, such as object metadata 554 stored in metadata store 550. For example, when a new object is written to object store 560, at least one new metadata entry may be created in metadata store 550 to represent parameters describing or related to the newly created object. Metadata manager 524 may generate and maintain an object data index 552 that enables metadata manager 524 to locate object metadata within metadata store 550. For example, metadata store 550 may be organized as a key-value store and object data index 552 may include key values for data objects and/or operations related to those objects that are indexed with a key value that include the object identifier or GUID for each object. In some embodiments, metadata manager 524 may also manage object metadata stored in object store 560 with object data 564. Metadata manager 524 may work in conjunction with storage manager 526 to create, modify, delete, access or otherwise manage object metadata stored as object tags 566 within object store 560.

Storage manager 526 may include interfaces, functions, and/or parameters for reading, writing, and deleting object data elements in object store 560. For example, object PUT commands may be configured to write object identifier 562, object data 564, and/or object tags 566 to object store 560. Object GET commands may be configured to read data from object store 560. Object DELETE commands may be configured to delete data from object store 560, or at least mark a data object for deletion until a future garbage collection or similar operation actually deletes the data or reallocates the physical storage location to another purpose.

Other object storage commands may be handled by storage manager 526, including special functions defined for version control. Object storage commands processed by storage manager 526 may include parameters for accessing special functions and/or metadata resources stored with host or client data in the data objects. Storage manager 526 may work in conjunction with metadata manager 524 and version control manager 530 for managing object metadata, including versioning information. Storage manager 526 may work in conjunction with replication manager 542 to replicate or migrate data from object store 560 to another data store. For example, storage manager 526 may read the object store 560 for transfer by one or more replication engines managed by replication manager 542.

Client response handler 528 may include an interface and/or communication logic for sending response messages, such as result, status, or error messages, to one or more clients related to object data requests received. For example, client response handler 528 may wait for processing by metadata manager 524 and/or storage manager 526 to complete or generate an error, and then provide an appropriate result or error message to the client system(s) for each object data request received In some embodiments, metadata store 550 may be distributed across multiple systems, such as a plurality of access systems. Metadata store 550 and/or portions thereof may be sharded data stores, wherein the data stores are partitioned into segments stored in different computing systems. Storage interface 520 may include the functions for locating and accessing relevant portions of the sharded data base.

Version control manager 530 may be invoked by storage interface 520 to manage version control for one or more data objects, buckets, or all of object store 560. For example, if versioning is enabled, each time the same object name is written, a new object version may be created. Similarly, which object version is returned from a read operation may be determined by a version identifier included as a parameter of the read operation and/or may default to the most recent version. Version control manager 530 may provide interfaces, functions, and parameters for managing the use of persistent version fields to version control across heterogeneous data stores. In some embodiments, version control manager 530 may be included within storage interface 520, such as within library functions used by client request handler 522, metadata manager 524, storage manager 526, and/or client response handler 528.

In some embodiments, version control manager 530 may include one or more hardware and/or software modules for executing specific operations. For example, version control manager 530 may include a versioning enabler 532, persistent version fields 534, version field writer 536, version field reader 538, and delete marker writer 540.

Versioning enabler 532 may include one or more parameters, data structures, and/or related methods for manipulating those parameters or data structures. Versioning enabler 532 may be configured to manage versioning status for object store 560 and/or specific buckets or data object contained therein. In some embodiments, each bucket may include a versioning enabled field to determine whether versioning is enabled for that bucket. For example, the versioning enabled field may be a first value if versioning is enabled for a target data object, bucket, or object store and a second value if versioning is not enabled for the target data object, bucket, or object store. In some embodiments, versioning enabled fields may include more values to convey whether versioning is available (supported but not enabled), versioning is unsupported, or versioning is suspended (previously enabled but inoperative due to an interruption, conflict, or configuration choice at the bucket or object level). Versioning enabler 532 may also include one or more configurable parameters that define how versioning is handled by version control manager 530. For example, an object storage system may support both a default, local version control configuration and a persistent version control configuration for use across object storage systems. In some embodiments, versioning enabler 532 may include a parameter for determining whether version fields are stored in a metadata database, such as in object metadata 554 in metadata store 550, or with object data, such as in object tags 566 in object store 560.

In some embodiments, version control manager 530 may manage both local version metadata and persistent version metadata. For example, if versioning is enabled for a particular bucket or data object, version control manager 530 may generate and tag each object version according to a local version control protocol. The local version control protocol may define the assignment of local version fields, including a local version number and creation timestamp. These version control fields may be generated according to the local object storage system configuration and be accessed through version commands and parameters defined in the configuration. If persistent versioning is enabled, then a separate set of persistent version fields 534 may be generated and stored in metadata inaccessible to the local version control commands and parameters. In some embodiments, persistent version fields 534 may be based on the local version fields in the object storage system that initially generates the versioned data object. For example, version identifiers and creation timestamps from the local version data may be incorporated into the persistent version fields. In other embodiments, persistent version fields may use a separate method and/or syntax for assigning persistent version fields, with an independently generated version identifier and/or creation timestamp. Versioning enabler 532 may manage whether versioning is enabled with local versioning 532.1 and/or persistent versioning 532.2.

Persistent version fields 534 may include one or more parameters, data structures, and/or related methods for configuring and generating persistent version fields for object versions. For example, a persistent version field configuration may include bucket name 534.1, bucket identifier 534.2, version identifier 534.3, and creation timestamp 534.3. In some embodiments, persistent version fields 534 may each include a series of values corresponding to the subfields and stored and presented according to a defined syntax. For example, an example persistent version field could be "bucket1.1234.1111.05/12/2018-01:00:00". In some embodiments, persistent version fields 534 may be stored in separate entries or subfield values, rather than being combined in a single tag or entry as a string or series of values. In some embodiments, persistent version fields 534 may be originated when the object is initially created by a first object storage system and are transferred with the object versions whenever they are migrated or replicated. As a result, the original version information, including creation timestamp, may be determined from the object metadata, regardless of where that version of the object ends up or how many heterogeneous object stores it may have been transferred through (or when or in what order).

Version field writer 536 and version field reader 538 may include functions, methods, or operations for providing the persistent version fields 556, 568 to be written to metadata and read from metadata in an associated object data source. For example, for any given object version being created and stored to object store 560, version field writer 536 may use persistent version fields 534 as a template to populate persistent version fields 556, 568 with corresponding values for the write operation, such as data bucket name, data bucket identifier, version identifier, and creation timestamp values related to the write operation. For any given read operation for a versioned data object or object version thereof, version field reader 538 may identify the persistent version field from the metadata for each object version of interest and use persistent version fields 534 as a template to extract and return the corresponding values for the fields. In some embodiments, version field writer 536 and version field reader 538 may be called by storage interface 520 and/or version recovery write 544, version wrapper read 546, and/or version controlled delete 548.

Delete marker writer 540 may include functions, methods, or operations for generating a version controlled delete marker, both object configuration and metadata. For example, when a delete event is identified for a versioned data object, such as processing a delete command for the versioned data object that is received by storage interface 520, delete marker writer 540 may generate a data object version with no host data (or a host data object size of 0) and a persistent version field that identifies the object version as a delete marker. This delete marker object version may have the same data object name (like any other object version) and be managed and transferred like any other object version in for the versioned data object.

In some embodiments, the delete marker may include a delete marker identifier, such as a flag, tag, or similar value, added to the persistent version field to identify the object version as a delete marker. The delete marker may include a delete version identifier and/or a delete timestamp value, similar to other persistent version fields. In some embodiments, delete marker writer 540 may use or interact with version field writer 536 to generate and write the delete marker metadata and version field reader 538 may be configured to read and identify delete marker metadata from persistent version fields.

Replication manager 542 may include functions, methods, or operations for managing the transfer of data objects, including versioned data objects, to other object stores or object storage systems. For example, replication manager 542 may manage one or more replication engines that move data objects from object store 560 to a destination object store that may be remote from object store 560. Replication manager 542 may be configured to transfer data objects between heterogeneous data stores. In some embodiments, replication manager 542 transfers each versioned data object, including object identifiers 562, object data 564, and associated object tags 566, which may include persistent version fields 568. In some embodiments, replication manager 542 may also transfer metadata associated with the data object from a corresponding metadata store, such as metadata store 550, using object data index 552 to identify associated object metadata 554, which may include persistent version fields 568.

In some embodiments, replication manager 542 may be configured for asynchronous data transfers. For example, a scheduler may select object for transfer based on criteria other than the order in which they were ordered within object store 560, such as object size, availability, etc. In some embodiments, multiple replication engines may operate in parallel and transfer object versions for the same versioned data object at similar times and using resources and paths that may result in different transfer rates. Thus, the object versions of versioned data objects may be ingested at the destination system in a different order than they were stored in object store 560 or even a different order than they were sent.

Version recovery write 544 may a include a command, interface protocols, and/or a set of functions and parameters for a special recovery write operation to rebuild one or more data objects using persistent version fields 556, 568. For example, following a failure event where a data object is lost in a prior object store location where it was created, version recovery write may perform a special data object write that overwrites newly created metadata with the original metadata from persistent version fields 556, 568. As a result, the original bucket name, bucket identifier, version identifier, and creation timestamp from the creation of the original object version is recreated. The resulting recovered data object may be functionally identical to the original data object such that client systems and libraries may interact with it as if it were the original data object, without any need to update those client systems or libraries. Note that the metadata from the persistent version fields may be used to both write the persistent version field in the recovered data object and write other metadata fields or entries that would normally be written with newly generated metadata. For example, the creation timestamp may be recorded in metadata for the newly created data object with a new creation time, but be interrupted or overwritten with the original creation timestamp from the original data object.

Version wrapper read 546 may include a command, interface protocols, and/or a set of functions and parameters for a special read operation to evaluate persistent version fields 556, 568 for each object version to return a selected version based on their original creation timestamps and/or version identifiers. For example, a version wrapper GET command may include a default parameter to return the most recent object version from the plurality of object versions corresponding to an ordered object based on searching their creation timestamp values in persistent version fields 556, 568. Version wrapper read 546 may accept parameters to return other selected versions, such as the first version, by original creation timestamp, or indexed by the version identifiers in persistent version fields 556, 568, which may not correspond to version identifiers assigned by a receiving data object system. In some embodiments, version wrapper read 546 may operate as a query against object metadata 554 in metadata store 550 or a special metadata tag read against object tags 566 in object store 560.

Version controlled delete 548 may include a command, interface protocols, and/or a set of functions and parameters for a special write operation to add a persistent delete marker to the object versions, using persistent version fields 556, 568 to assure persistence if the versioned data object is moved before deletion and related garbage collection are completed. For example, version controlled delete 548 may use delete marker writer 540 to write an empty data object with the same object name and a persistent version field containing the delete marker identifier.

Memory 516 may include additional logic and other resources (not shown) for processing object data requests, such as modules for generating, queueing, and otherwise managing object data requests. Processing of an object data request by storage interface 520 may include any number of intermediate steps that yield at least one data request to the distributed storage system.

Figure 6:
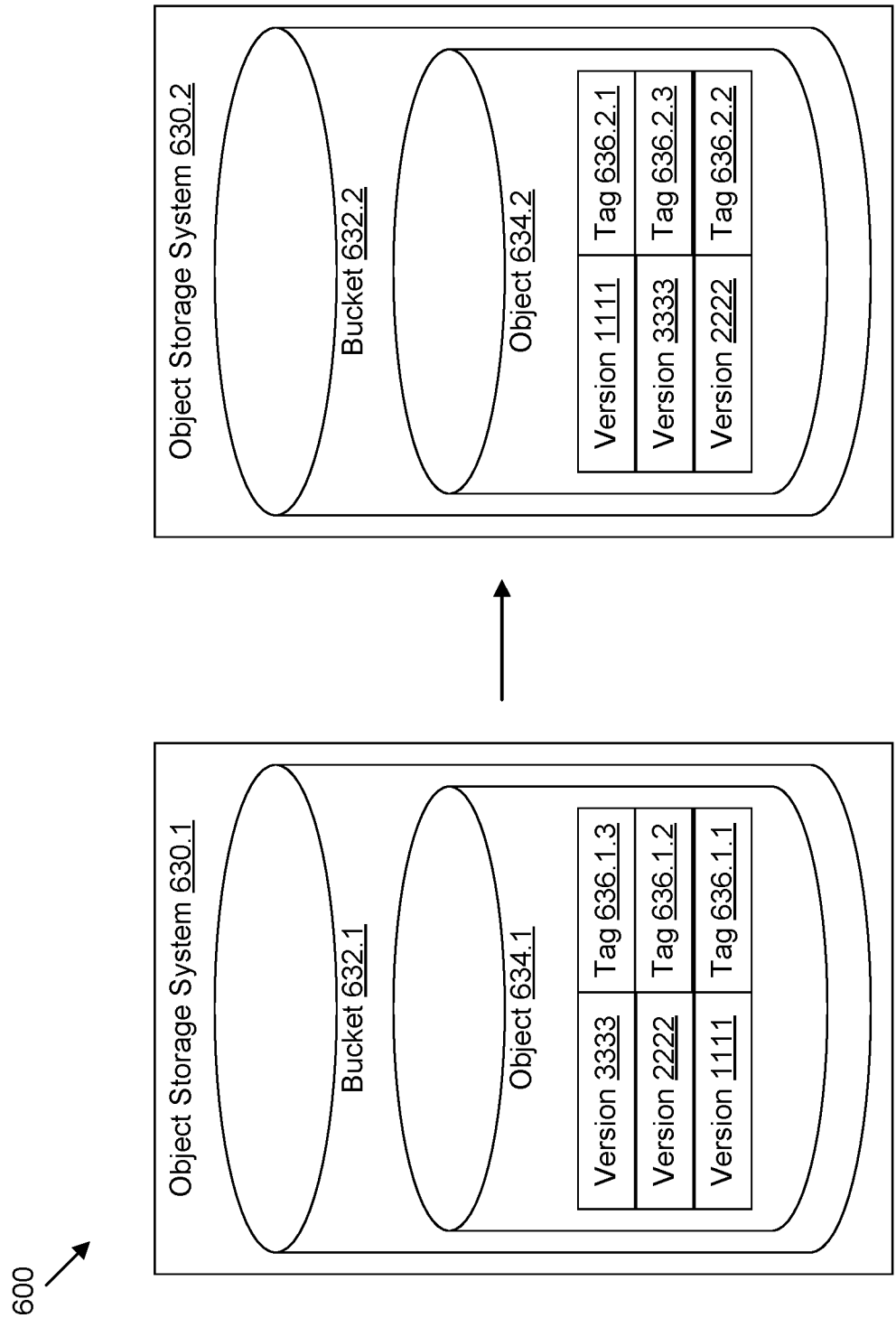
FIG. 6 schematically illustrates data objects transferred between example heterogeneous data stores with out-of-order ingest.

FIG. 6 shows versioned data object 643 transferred between example heterogeneous data stores 600 in object storage systems 630.1 and 630.2 with out-of-order ingest. In some embodiments, heterogeneous data stores 600 may be configured according to the systems and elements described with regard to FIGS. 1-5. Versioned data object 643 is shown in bucket 632 on both object storage systems 630. Object 634.1 in bucket 632.1 may be the originating object store where object 634.1 and corresponding object versions 1111, 2222, 3333 where initially created in sequential order. Metadata tags 636.1.1, 636.1.2, and 636.1.3 may include persistent version fields containing the original version data, including version identifier and creation timestamp corresponding to the sequential versions of the data object.

Through a data transfer process from object storage system 630.1 to object storage system 630.2, the object versions were ingested in object storage system 630.2 in a different order. Object version 2222 was written first, followed by object version 3333, followed by object version 1111. The object versions are out of sequential order. In some embodiments, object storage system 630.2 may assign local creation timestamps and version identifiers that correspond to the out-of-order ingest: 2222, 3333, 1111. However, metadata tags 636.2.1, 636.2.2, and 636.2.3 have been maintained with their respective object versions and each may contain the persistent version fields with the original creation timestamps and version identifiers. As a result, a version wrapper read function may correctly identify target object versions using the persistent version fields. A version recovery write 544 may be used to recover the original version sequential order, creation timestamps, and version identifiers to reorganize the metadata in object storage system 630.2 or recover the versioned data object back to object storage system 630.1 following a disaster recovery event.

Figure 7:
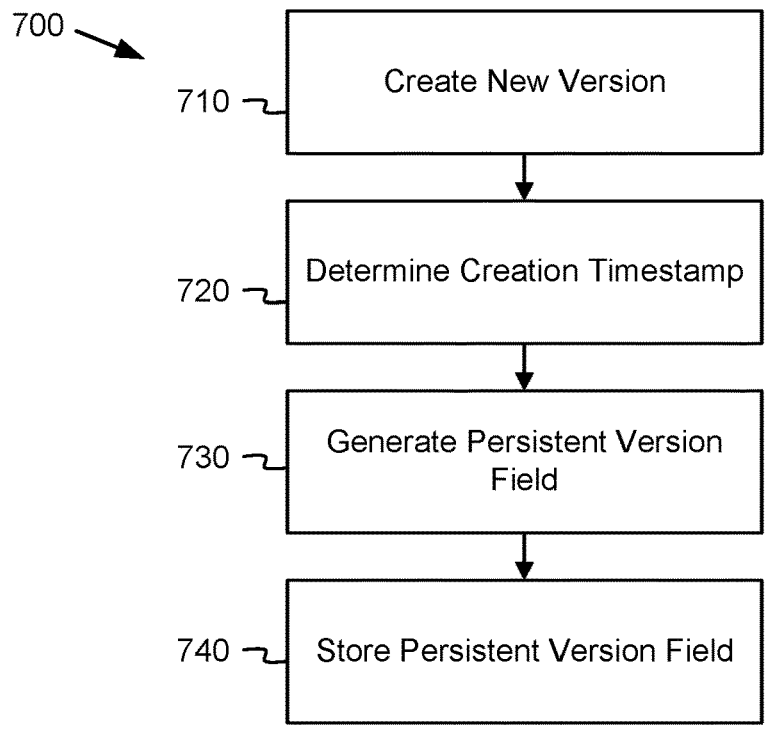
FIG. 7 illustrates an example method for storing persistent version fields.

As shown in FIG. 7, the object storage system 500 may be operated according to an example method for storing persistent version fields, i.e. according to the method 700 illustrated by the blocks 710-740 of FIG. 7.

When an object storage system is configured with object versioning enabled, a new object version may be created at block 710 in response to a write command with a versioned data object's object name. For example, a PUT command specifying an existing data object name may create a new sequential object version of that data object.

At block 720, a creation timestamp may be determined by the object storage system. For example, the object storage system may include a processor configured to identify the time at which the write operation starts or completes according to the system clock and write the creation timestamp to object metadata and/or an operational log.

At block 730, a persistent version field may be generated for the new object version. For example, the object storage system may specify a set of persistent version parameters or subfields to be included in the persistent data filed, such as bucket name, bucket identifier, version identifier, and the creation timestamp determined at block 720. In some embodiments, the persistent version field may be generated in addition to local versioning information, such as a local version identifier, and the persistent version field may incorporate one or more values from the local versioning information.

At block 740, the persistent version field may be stored in metadata associated with the object version. For example, the persistent version field may be written to object metadata stored in a metadata table or metadata tags stored with the data object.

Figure 8:
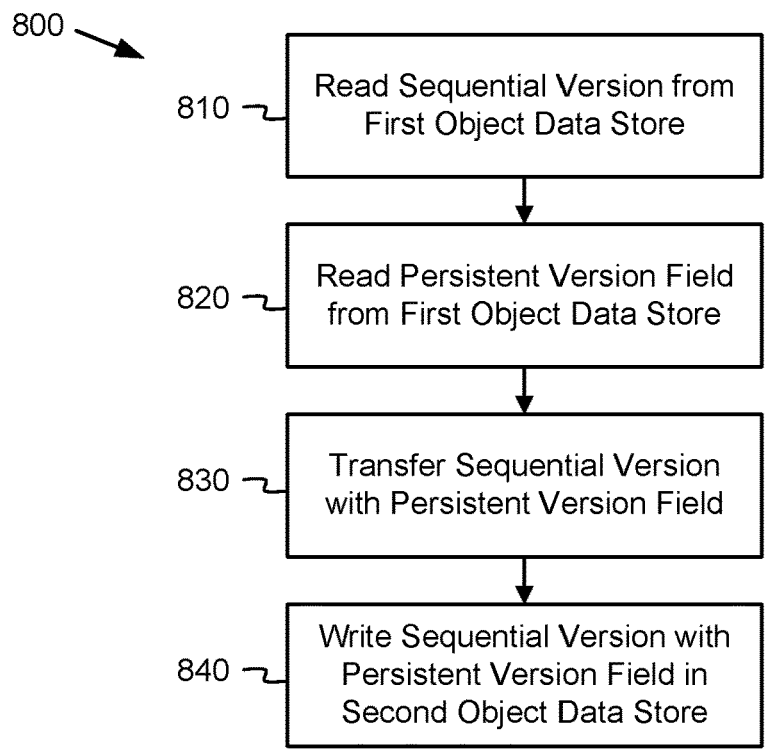
FIG. 8 illustrates an example method of transferring data objects with persistent version fields between data stores.

As shown in FIG. 8, the object storage system 500 may be operated according to an example method of transferring data objects with persistent version fields between data stores, i.e. according to the method 800 illustrated by the blocks 810-840 of FIG. 8.

A replication manager or similar system may initiate an object data transfer between two (or more) object data stores. The object data transfer may include reading, transferring, and writing each object version in a sequence of object versions corresponding to a versioned data object. In some embodiments, each sequential object version may be transferred in sequence, in one or more parallel groups, or out-of-sequence. Method 800 may be executed iteratively for each object version in the set of object versions corresponding to the versioned data object.

At block 810, a sequential object version may be read from a first object data store. For example, a GET command may be used by a replication engine to access a specified object version, such as the next untransferred object version for the versioned data object.

At block 820, the persistent version field corresponding to the sequential object version may be read. For example, the persistent version field may be stored in a metadata entry or tag associated with the data object and be retrieved as part of the GET command.

At block 830, the sequential object version and the corresponding persistent version field is transferred from the first object data store to the second object data store. For example, the replication engine may establish a data transfer connection between the two object data stores and transfer the object using a single or multi-part PUT command. In some embodiments, the persistent version field is stored in object metadata that is read and transferred as part of a standard data replication command without the replication engine identifying the presence of the persistent version field. For example, the sequential object may be read and managed in accordance with its local version information for the purpose of transferring the object and the persistent version field may be transferred along with other object metadata.

At block 840, the sequential object version and the corresponding persistent version field is written to the second object data store. For example, the second object data store may receive and store the sequential object version in its object store and write the corresponding persistent version field to the appropriate metadata location, such as a metadata table or metadata tag written with the data object. In some embodiments, new, local versioning information may also be stored for the object version in the second object store according to the versioning configuration of the second object store. This new set of local versioning information may be generated independent of the persistent version information transferred in the persistent version field.

Figure 9:
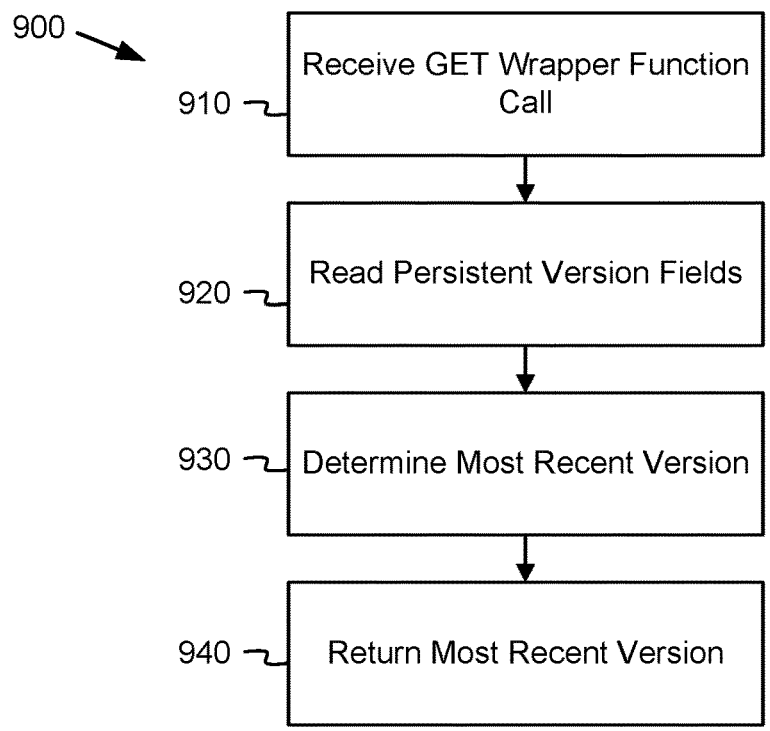
FIG. 9 illustrates an example method of executing a version wrapper read function.

As shown in FIG. 9, the object storage system 500 may be operated according to an example method of executing a version wrapper read function, i.e. according to the method 900 illustrated by the blocks 910-940 of FIG. 9.

At block 910, a GET wrapper function call may be received by an object storage system. For example, a client or system resource may initiate a version wrapper read function by submitting a special GET function call with parameters specifying that the wrappers (metadata tags or metadata entries) of the object versions should be evaluated to identify the desired object version (or versions) to be returned for the function call. In the example shown, the GET wrapper function call may include a default parameter for returning the most recent version of the versioned data object based on creation timestamps in the persistent version fields. In other examples, the GET wrapper function call may include parameters to return other selected versions based on the creation timestamp and/or original version identifiers.

At block 920, the persistent version fields are read for each of the object versions for the versioned data object. For example, metadata for each of the object versions may be accessed to read the persistent version fields or a relevant portion thereof, such as the creation timestamp subfields.

At block 930, the most recent version may be determined by comparing creation timestamps from the persistent version fields. For example, a processor may compare or sort the creation timestamp values read from the persistent version fields to determine which object version was created most recently or latest in time.

At block 940, the most recent object version may be returned in response to the GET wrapper function call. For example, the most recent object version determined at block 930 may be returned as a result to the client or system resource that sent the GET wrapper function call. In some embodiments, the data object and/or related metadata for the most recent object version may be returned in response to the call. In some embodiments, a version identifier, such as the version identifier in the persistent version field or a local version identifier that can be used to access the most recent version, may be returned.

Figure 10:
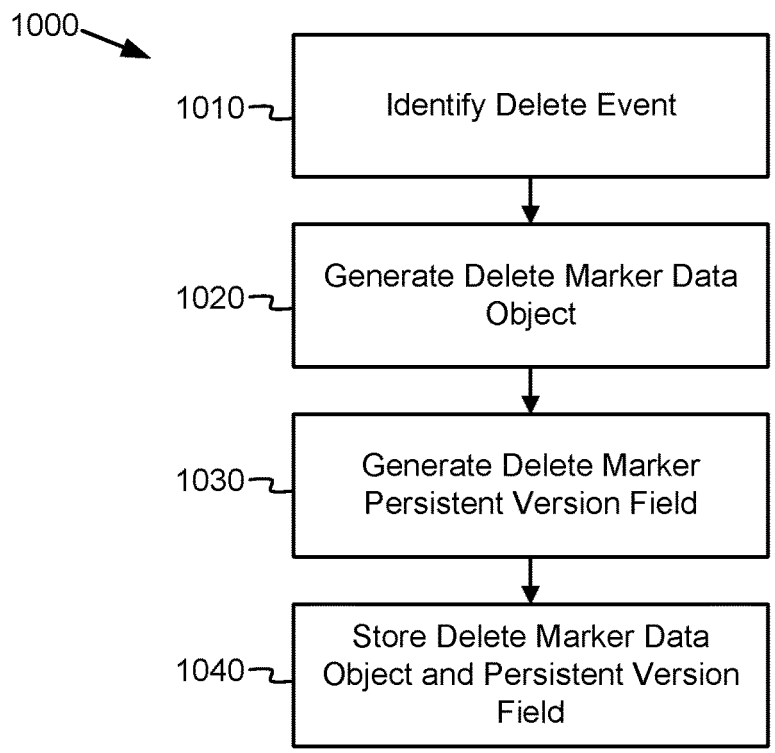
FIG. 10 illustrates an example method of executing a version controlled delete function.

As shown in FIG. 10, the object storage system 500 may be operated according to an example method of executing a version controlled delete function, i.e. according to the method 1000 illustrated by the blocks 1010-1040 of FIG. 10.

At block 1010, a delete event is identified. For example, a DELETE command for a versioned data object may be received by object storage system 500 from a client or system resource.

At block 1020, a delete marker data object may be generated. For example, an empty data object with the same data object name may be generated as the delete marker and a sequential object version for the versioned data object. In some embodiments, the data object may include a minimal data element that does not include any host data.

At block 1030, a persistent version field is generated for the delete marker object version. For example, the delete marker data object may be treated as a new object version according to method 700 of FIG. 7 and a persistent version field containing the version identifier and creation timestamp may be generated.

At block 1040, the delete marker data object and associated persistent version field are stored in the object store. For example, the delete marker data object may be written to the object data store and the persistent version field may be written into metadata for the delete marker data object.

Figure 11:
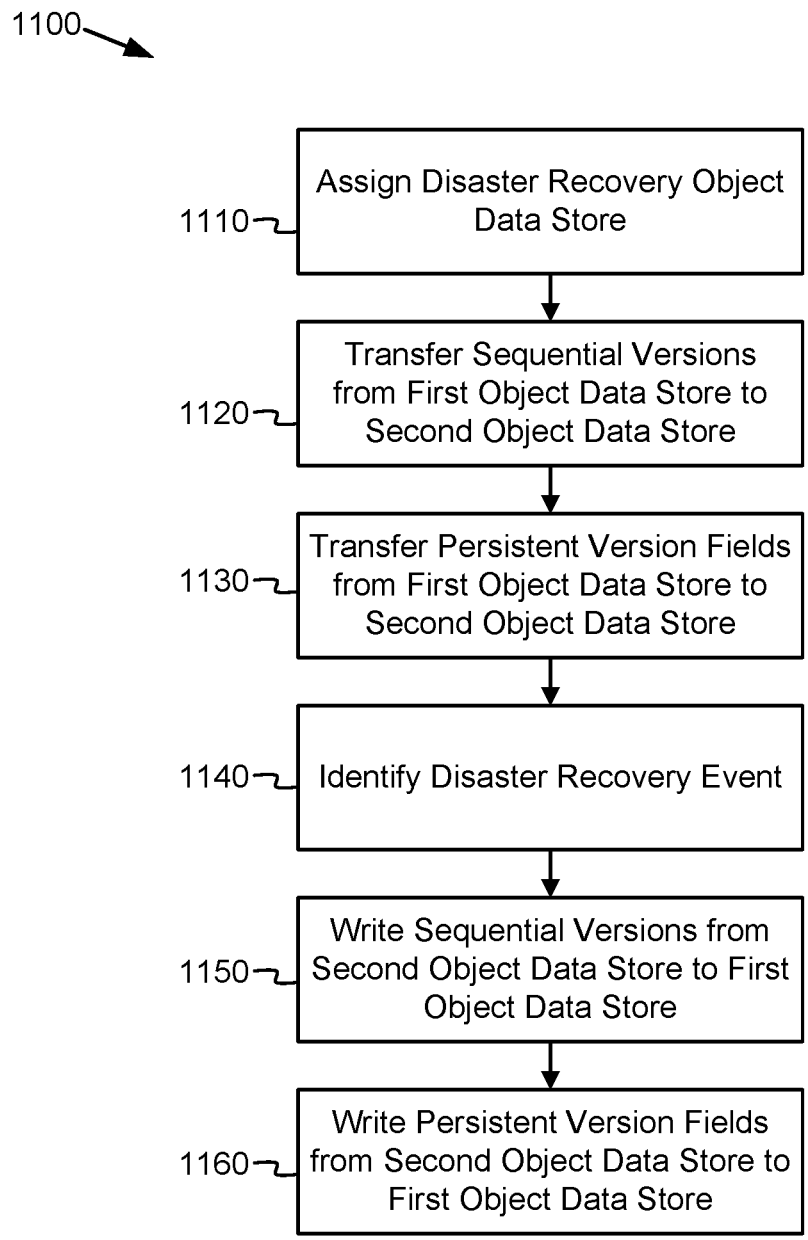
FIG. 11 illustrates an example method of executing a version recovery write function.

As shown in FIG. 11, the object storage system 500 may be operated according to an example method of executing a version controlled delete function, i.e. according to the method 1100 illustrated by the blocks 1110-1160 of FIG. 11.

At block 1110, an object data store is assigned for replication in case of a need for disaster recovery. For example, a first object data store may be assigned a second object data store at a second location to receive replicated copies of versioned data objects stores in the first object data store. The second object data store acts as a disaster recovery option in the event that data is lost at the first object data store. Note that disaster recovery object stores may be assigned for an entire data store, a bucket, a versioned data object, or any other logical data unit for backup data management.

At block 1120, sequential object versions from the first object data store are stored to the second object data store. For example, a replication manager may asynchronously replicate the sequential object versions for a selected versioned data object between the two object data stores.

At block 1130, persistent version fields for the sequential object versions are also stored in the second object data store from the first object data store. For example, the persistent version fields may be replicated with the sequential object versions as they are transferred from the first object data store to the second object data store.

At block 1140, a disaster recovery event is identified. For example, one or more failures at the first object data store may cause the loss of the original versioned data object and/or one or more corresponding object versions. Upon identifying the failure and/or data loss, a disaster recovery event may be generated by system resources or submitted by a data administrator, identifying the disaster recovery event and initiating a process to rebuild the versioned data object in the first object data store.

At block 1150, sequential object versions from the second object data store are written back to the first object data store. For example, one or more object versions may be identified for recovery from the disaster recovery event and transferred from the second object data store using a special version recovery write function.

At block 1160, persistent version fields for the sequential object versions are also written from the second object data store back to the first object data store. For example, the object versions being recovered may have their persistent version fields transferred with the data objects. In some embodiments, the version recovery write may include special write conditions to recreate object metadata in addition to the persistent version field itself, based on the metadata in the persistent version field.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   a first object data store configured to include a first plurality of versioned data objects, wherein a versioned data object of the first plurality of versioned data objects includes a plurality of sequential versions corresponding to the versioned data object;
   a version control manager associated with the first object data store, wherein the version control manager includes instructions stored in at least one memory and executable by at least one processor to:
      determine, in response to creation of each sequential version of the plurality of sequential versions, a first creation timestamp for each sequential version of the plurality of sequential versions;
      store a persistent version field for each sequential version of the plurality of sequential versions; and
      store a first local version field for each sequential version of the plurality of sequential versions, wherein the first local version field is based on the first creation timestamp of that sequential version of the plurality of sequential versions; and
   a replication manager including instructions stored in at least one memory and executable by at least one processor to:
      read the plurality of sequential versions corresponding to the versioned data object;
      read the persistent version field for each sequential version of the plurality of sequential versions; and
      transfer the plurality of sequential versions and the persistent version field for each sequential version of the plurality of sequential versions to a second object data store, wherein the second object data store is configured to:
         determine, in response to receipt of each sequential version of the plurality of sequential versions, a second creation timestamp for each sequential version of the plurality of sequential versions; and
         assign, in an order in which the plurality of sequential versions are received by the second object data store and based on the second creation timestamp, a second local version field for each sequential version of the plurality of sequential versions.

2. The system of claim 1, wherein the second object data store is further configured to store, in an associated object data source for the second object data store, the persistent version field for each sequential version of the plurality of sequential versions.

3. The system of claim 1, wherein the version control manager further includes instructions executable to:
 read the persistent version field for each sequential version of the plurality of sequential versions;
 determine, based on the persistent version field, a most recent version from the plurality of sequential versions; and
 return the most recent version from the plurality of sequential versions.

4. The system of claim 1, wherein the version control manager further includes instructions executable to:
 generate, responsive to a delete event, a delete marker sequential version in the plurality of sequential versions, wherein the persistent version field for the delete marker includes a delete timestamp value corresponding to the delete event.

5. The system of claim 4, wherein the delete marker sequential version is a data object including:
 a host data object size of 0;
 a delete marker data object name equal to a data object name of the versioned data object; and
 a delete marker identifier.

6. The system of claim 1, wherein the persistent version field for each sequential version of the plurality of sequential versions includes:
 a unique version identifier for a selected sequential version; and
 the creation timestamp for the selected sequential version.

7. The system of claim 6, wherein the persistent version field for each sequential version of the plurality of sequential versions further includes:
 a data object name of the versioned data object; and
 a data bucket name of a data bucket containing the plurality of sequential versions for the versioned data object.

8. The system of claim 1, wherein storing a persistent version field for each sequential version of the plurality of sequential versions comprises storing the persistent version field for each sequential version of the plurality of sequential versions in an associated object data source selected from:
 a first metadata store for the first object data store; and
 object data tags stored with each of the plurality of sequential versions in the first object data store.

9. A computer-implemented method, comprising:
 creating a new version of a versioned data object, wherein:
  the versioned data object is stored in a first object data store;
  the versioned data object includes a plurality of sequential versions corresponding to the versioned data object; and
  the new version of the versioned data object is a most recently created version among the plurality of sequential versions;
 determining, in response to creation of the new version, a first creation timestamp for the new version;
 storing a persistent version field for the new version;
 storing a first local version field for the new version, wherein the first local version field is based on the first creation timestamp for the new version;
 reading the plurality of sequential versions corresponding to the versioned data object;
 reading persistent version fields for each sequential version of the plurality of sequential versions;
 transferring the plurality of sequential versions and the persistent version fields for each sequential version of the plurality of sequential versions to a second object data store;
 determining, by the second object data store and in response to receipt of each sequential version of the plurality of sequential versions, a second creation timestamp for each sequential version of the plurality of sequential versions; and
 assigning, in an order in which the plurality of sequential versions are received by the second object data store and based on the second creation timestamp, a second local version field for each sequential version of the plurality of sequential versions.

10. The computer-implemented method of claim 9, further comprising:
 storing, in an associated object data source for the second object data store, the persistent version fields for each sequential version of the plurality of sequential versions.

11. The computer-implemented method of claim 9, further comprising:
 reading persistent version fields for each sequential version of the plurality of sequential versions;
 determining, based on the persistent version fields, a most recent version from the plurality of sequential versions; and
 returning the most recent version from the plurality of sequential versions.

12. The computer-implemented method of claim 11, further comprising:
 receiving a get wrapper function call for the versioned data object, wherein reading persistent version fields, determining the most recent version, and returning the most recent version are performed responsive to the get wrapper function call.

13. The computer-implemented method of claim 9, further comprising:
 generating, responsive to a delete event, a delete marker sequential version in the plurality of sequential versions, wherein the persistent version field for the delete marker includes a delete timestamp value corresponding to the delete event.

14. The computer-implemented method of claim 13, wherein the delete marker sequential version is a data object including:
 a host data object size of 0;
 a delete marker data object name equal to a data object name of the versioned data object; and
 a delete marker identifier.

15. The computer-implemented method of claim 9, wherein the persistent version field for the new version includes:
 a unique version identifier for the new version; and
 the creation timestamp for the new version.

16. The computer-implemented method of claim 15, wherein the persistent version field for the new version further includes:
 a data object name of the versioned data object; and
 a data bucket name of a data bucket containing the plurality of sequential versions for the versioned data object in the first object data store.

17. The computer-implemented method of claim 9, further comprising:

transferring the plurality of sequential versions and corresponding persistent version fields from the first object data store to the second object data store; and writing, responsive to a disaster recovery event, the plurality of sequential versions and corresponding persistent version fields from the second object data store to the first object data store.

18. The computer-implemented method of claim 9, wherein:

storing the persistent version field for the new version includes writing the persistent version field in an associated object data source for the versioned data object; and the associated object data source is selected from:
a first metadata store for the first object data store; and
object data tags stored with the new version in the first object data store.

19. A system, comprising:

a processor;

a memory;

a first object data store, configured to include a first plurality of versioned data objects, wherein a versioned data object includes a plurality of sequential versions corresponding to the versioned data object;

means, stored in the memory for execution by the processor, for determining, in response to creation of each sequential version of the plurality of sequential versions in the first object data store, a first creation timestamp for each sequential version of the plurality of sequential versions;

means, stored in the memory for execution by the processor, for storing, for each sequential version of the plurality of sequential versions, a persistent version field and a first local version field for the first object data store, wherein the first local version field is based on the first creation timestamp of that sequential version of the plurality of sequential versions; and means, stored in the memory for execution by the processor, for transferring, to a second object data store and in a different order than an order in which the plurality of sequential versions were created in the first object data store, the plurality of sequential versions and the persistent version fields for each sequential version of the plurality of sequential versions, wherein the second object data store is configured to:

determine, in response to receipt of each sequential version of the plurality of sequential versions, a second creation timestamp for each sequential version of the plurality of sequential versions; and assign, in an order in which the plurality of sequential versions are received by the second object data store and based on the second creation timestamp, a second local version field for each sequential version of the plurality of sequential versions.

20. The system of claim 19, further comprising:

means, stored in the memory for execution by the processor, for generating, responsive to a delete event, a delete marker sequential version in the plurality of sequential versions, wherein the persistent version field for the delete marker sequential version includes a delete timestamp value corresponding to the delete event.

* * * * *